United States Patent [19]

Popeil

[11] 4,027,419
[45] June 7, 1977

[54] FISHING RIG

[75] Inventor: Samuel J. Popeil, Chicago, Ill.

[73] Assignee: Popeil Brothers, Inc., Chicago, Ill.

[22] Filed: Oct. 20, 1975

[21] Appl. No.: 623,604

Related U.S. Application Data

[63] Continuation of Ser. No. 474,661, May 30, 1974, abandoned, which is a continuation of Ser. No. 269,815, July 7, 1972, abandoned.

[52] U.S. Cl. .................. 43/18 R; 43/20; 43/23; 43/24
[51] Int. Cl.² .......................................... A01K 87/00
[58] Field of Search ............ 43/18 R, 18 GF, 20, 43/21, 23, 24, 25, 25.2, 16, 17; 242/84.2 A

[56] References Cited

UNITED STATES PATENTS

| | | | |
|---|---|---|---|
| 1,398,717 | 11/1921 | Gillette | 43/23 |
| 2,465,744 | 3/1949 | Olender | 43/23 |
| 2,855,717 | 10/1958 | Heil | 43/18 R |
| 3,143,822 | 8/1964 | Schooley | 43/17 |
| 3,397,480 | 8/1968 | Bengtsson | 43/18 R |
| 3,438,594 | 4/1969 | Bellefeville | 242/84.2 A |
| 3,484,979 | 12/1969 | Wonsch | 43/20 |
| 3,529,375 | 9/1970 | Dey | 43/17 |

FOREIGN PATENTS OR APPLICATIONS

| | | | |
|---|---|---|---|
| 34,021 | 12/1912 | Sweden | 43/24 |
| 214,285 | 7/1967 | Sweden | 43/16 |

OTHER PUBLICATIONS

TEHO, No. 3, Commercial Fishing Rod and Reel, Made in Finland, A. Ruppa, Inventor.

*Primary Examiner*—Warner H. Camp
*Attorney, Agent, or Firm*—Dominik, Knechtel, Godula & Demeur

[57] ABSTRACT

A fishing rig which includes a housing for a spinning reel, a short rod section which pivots at its anchor end to engage the underneath portion of the reel housing, and a closed "C" shaped handle which also serves as a storage chamber for the lure, bobber, or other fish catching element employed at the end of the line. The handle is thin enough to fit in a fisherman's pocket for carrying, and also includes a belt hook for holding the rig to free the fisherman's hands. The bobber construction disclosed is of a floating member, unweighted, and which slides along the line to a point where a knot may be tied to determine the depth to which a weighted hook will sink, the bobber being slidable along the line to permit casting with the bobber adjacent the sinker.

33 Claims, 12 Drawing Figures

FISHING RIG

This is a continuation of now abandoned application Ser. No. 474,661 filed May 30, 1974, which was a continuation of now abandoned application Ser. No. 269,815 filed July 7, 1972.

FIELD OF INVENTION

The invention relates to a fishing rig, and more particularly, one which has a cantilever rod portion secured to a reel housing and handle, the rod being pivotally releasable to engage the underneath portion of the handle, and the handle containing a recessed storage space for the hook, bobber, or other fish catching element.

Typical of the prior art is U.S. Pat. No. 1,475,408 showing a bifurcated fishing rod, but it suffers the disadvantage of not being retractable. U.S. Pat. Nos. 2,561,237 and 3,499,241 show compact rigs, but also do not retract nor encourage good casting. The balance of the prior art patents illustrating compact fishing devices invariably disclose one in which the reel portion is detachable. Furthermore, with the compact units, they are disassembleable into several pieces, and thereafter packed into a kit, cloth sack, or the like.

Of the commercial devices, the "Mr. Fisherman" Olympic reel Mark I discloses a fishing reel with a closed handle portion, but no provisions are made for casting a lure or bobber. A "Teho-III" made in Finland has a retractable rod portion, but like the Olympic unit, lacks a spinning reel and other elements in combination which render the unit capable of casting long distances. In none of the prior art, whether patented or in public use, does there appear a combination of a portable fishing rig with a retractable rod which includes its own lure or tackle box so that the hook can be self contained and protected in the unit.

SUMMARY OF INVENTION

The invention contemplates a compact fishing rig in which a reel housing for a spinning reel constitutes the basic housing for the device. Preferably a C-shaped closed handle portion is at one end of the reel housing. A portion of the handle has a pocketed opening or tackle box in which a lure, bobber, or other fishing element may be stored. The cantilever rod portion is pivotally and lockably secured to the end of the reel housing which is remote from the handle, and a catch is provided in the base portion of the handle to releasably engage a rod ferrule in the compact or carrying configuration. Guide means are further provided so that when the rod is retracted the line may be wrapped through the guide means around the end of the C-shaped handle portion. The hook or bobber or other fishing material is secured within a tackle box on a portion of the handle. The line is thereafter wound tight thus compactly storing all elements of the fishing rig, but yet the rig is quickly convertible into a unit ready for the fisherman to use.

One aspect of the invention is directed to the bobber which is proportioned to nest within the handle storage portion and to slide along the line, being positionable close to a weighted hook for casting purposes, and yet able to slide up to a pre-adjusted position on the line after it has been cast into the water to hold the bait at a predetermined position below the surface.

Another aspect of the invention is directed to the "golf grip" relationship between the portion of the handle which is held by the user, the C-shaped opening which resists the same slipping out of the hand, and the reel clutch control mechanism.

It is a principal object of the present invention to provide a fishing rig of unitary construction which is compact for storage, and may be quickly assembled for the purpose of fishing without any external storage means such as a tackle box, folding container, or the like.

Related to the compactness of the fishing rig is the provision of a handle which permits carrying the rig in the fisherman's pocket. Also an objective of the invention is met by providing a belt hook which permits temporary placement of the fishing rig on the fisherman's belt freeing his hands for other tasks.

Another and important object of the present invention is to provide a compact fishing rig in which the hand of the user is positioned in golf grip relationship against the handle of the unit thereby facilitating long casting ability with a unit having a rod portion which is short and compact and made of one piece. A derivative advantage of the short rod portion is the ability to cast underhanded for a considerable distance, thereby permitting casting under overhanging trees, and in crowed areas such as in a small boat without catching the hook in a friendly fisherman, or pesky foliage.

A more detailed object of the present invention relates to a fishing rig in which the rod portion can be retracted into engagement with the handle portion, and the bobber, hook, and other fishing elements stored within a portion of the handle thereby eliminating the necessity of protecting the hook while the rig is stored.

Yet an important object of the present invention is to provide a fishing rig with a single reel housing which is readily disassembleable for cleaning the reel, replacing the line, and replacing the reel if the same becomes damaged, rusted, corroded, or broken.

Another object of the present invention is to provide a fishing rig for use in casting which, because of its simplicity and ease in gripping, can be readily mastered by a novice and serve as a training rig for more complex casting rods and reels.

THE DRAWINGS

Further objects and advantages of the present invention will become apparent as the following description of an illustrative embodiment proceeds, taken in conjunction with the accompanying drawings in which.

DESCRIPTION OF PREFERRED EMBODIMENT

Figures 1, 3, 4:
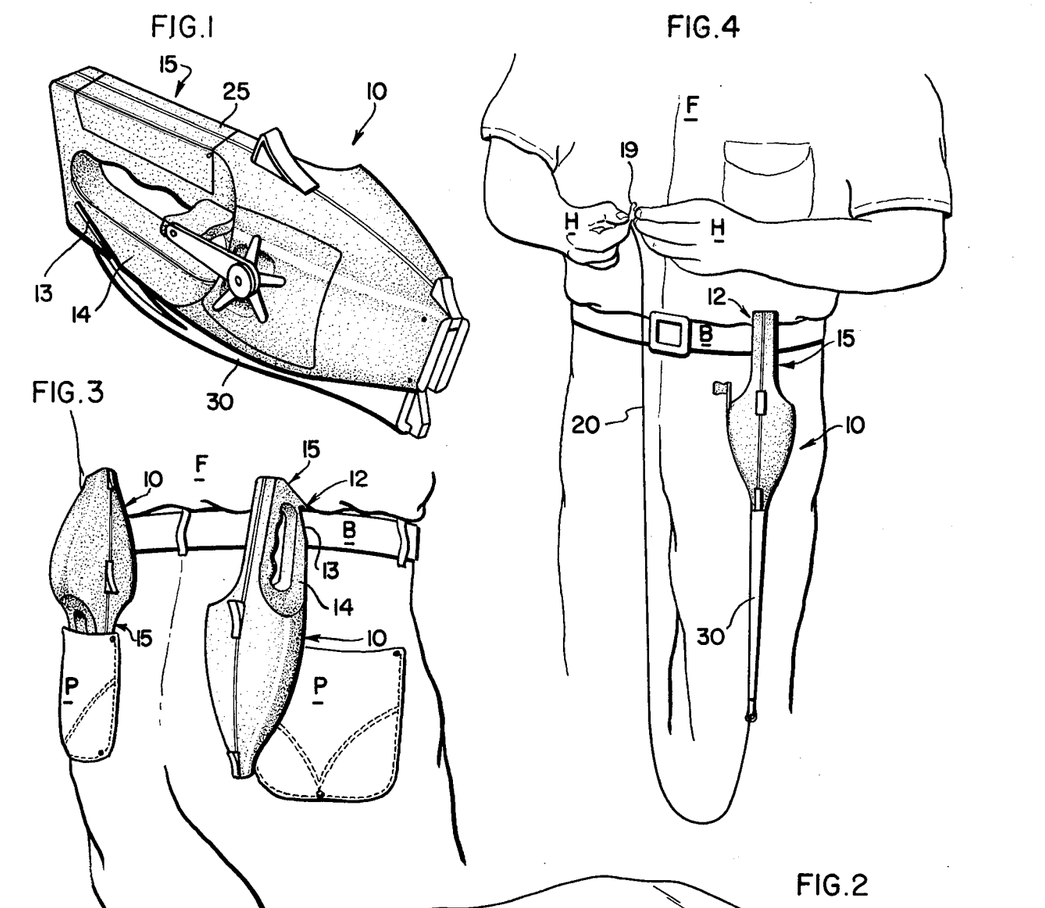
FIG. 1 is a perspective view of the fishing rig shown in its compact carrying configuration.
FIG. 3 further illustrates other carrying configurations of the fishing rig in the rear hip pocket of a fisherman, or hooked to his belt.
FIG. 4 shows a fisherman with the fishing rig, rod extended, hooked to his belt while baiting his hook.
Figure 2:
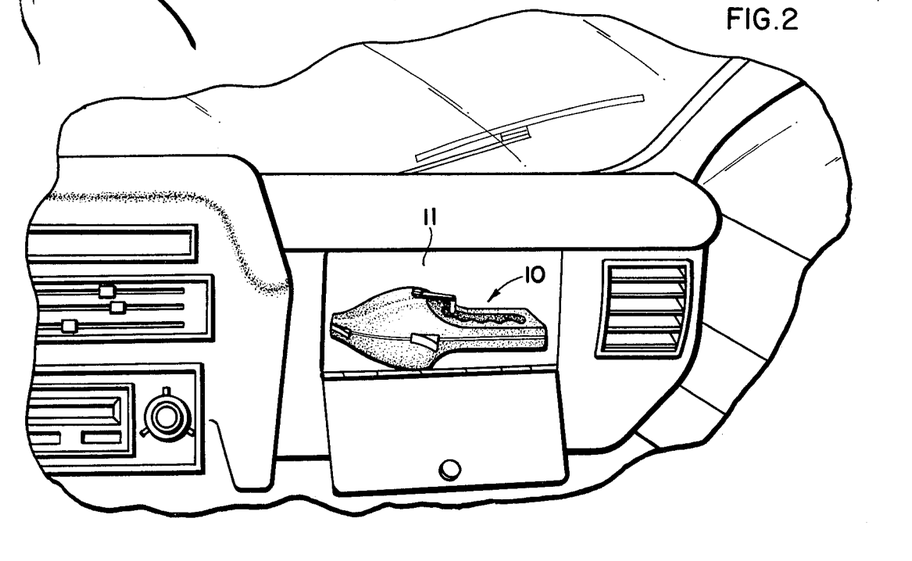
FIG. 2 is illustrative of the general size and proportion of the fishing rig, showing the same inside the glove compartment of a typical automobile.

Referring now to FIG. 1, it will be seen that the fishing rig 10, in its stored or travel configuration, is compact and absent extending parts which make storage difficult. In a typical commercial embodiment, the dimensions are approximately 10 inches long, 3 inches wide, and 4 inches high. It will be noted that the rod 30 is tucked underneath the reel housing 40 and handle 15, and the reel handle 51 reversed to fit within the opening provided in the handle 15. As illustrated in FIG. 2, the overall length of the commercial embodiment of approximately 10 inches in the travel position is such that the fishing rig 10 fits neatly within the glove compartment 11 of an automobile, even the compact variety. Further highly illustrative of the versatility of the fishing rig 10, is the illustration of FIG. 3 showing how the fishing rig 10 can be inserted in the hip pocket P of fisherman F. It will be noted in FIG. 2, that the handle 15 presents a relatively narrow silhouette, and thus the handle 15 slides neatly into the pocket P as shown. The bulging portion of the reel housing 40 is above the hip pocket P, but since its width is only approximately 3 inches, and the handle width approximately 1 inch, the fishing rig 10 can be easily carried in the average fisherman's pocket.

Also shown in FIGS. 2 and 4 is the carry position of the fishing rig 10 when the belt hook 12 of the handle 15 is placed over the belt B of the fisherman F. The belt hook slot 13 is formed in the lower portion 14 of the handle 15, and is angled to support the fishing rig away from the body of the fisherman F when the rod 30 is in the extended fishing position as shown in FIG. 4. Thus the fisherman F may temporarily lace the rig 10 on his belt B to bait his hook, change a lure, light a cigarette, open a can of his favorite beverage, or assist a fellow fisherman in landing a big one.

Figures 5, 6, 7:
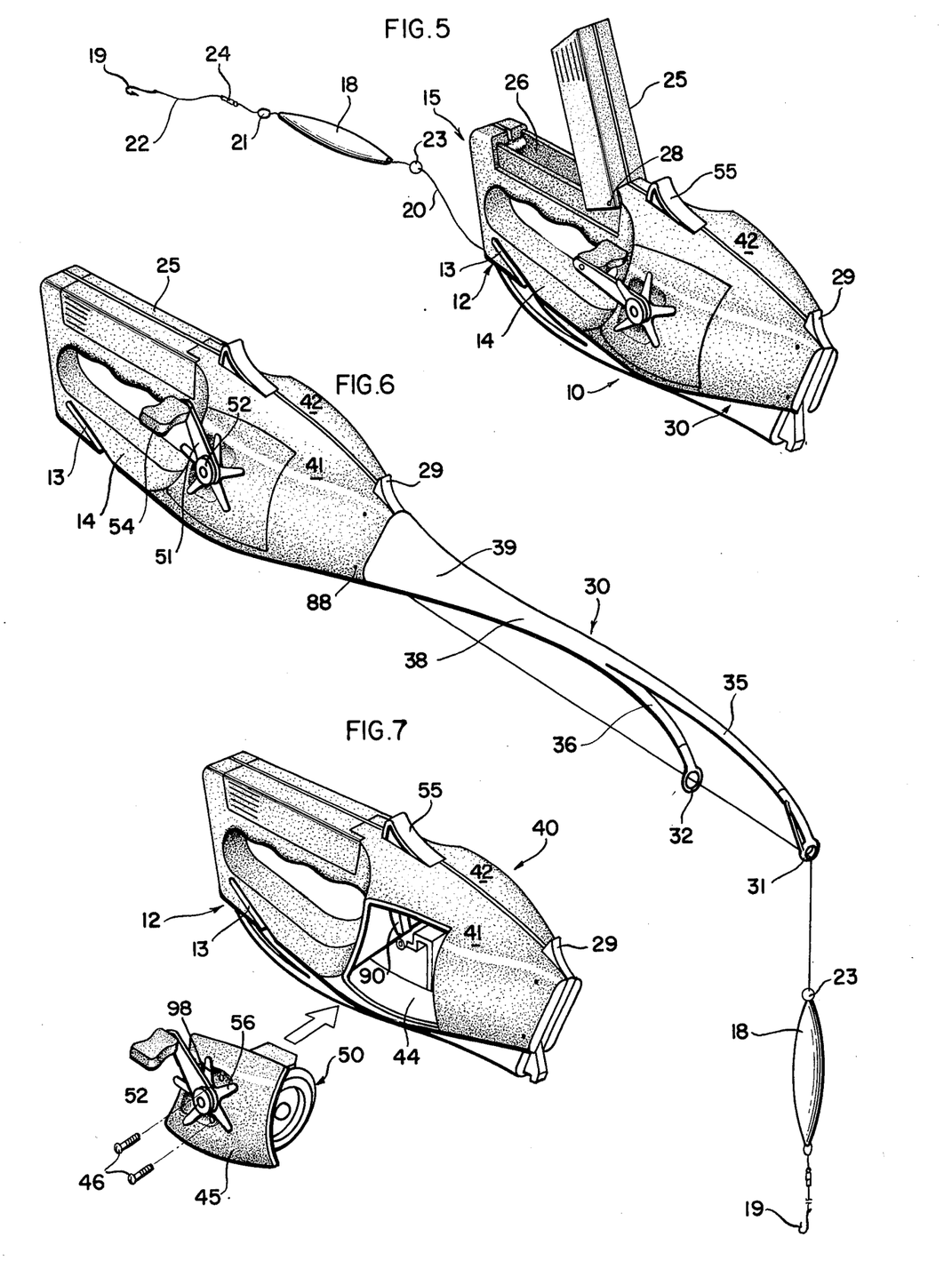
FIG. 5 is a view of the fishing rig illustrating the first step in preparing the same for fishing by opening the tackle box cover and removing the fish catching elements and the line.
FIG. 6 is a further sequential view of that shown in FIG. 5 showing how the fishing rod portion is swiveled into its locked position in preparation for fishing, and the reel handle is reversed from its retracted configuration to the fishing position.
FIG. 7 is a partially exploded perspective view showing the reel plate removed, and illustrating how the spinning reel portion may be removed from its reel chamber in the reel housing.
Figure 9:
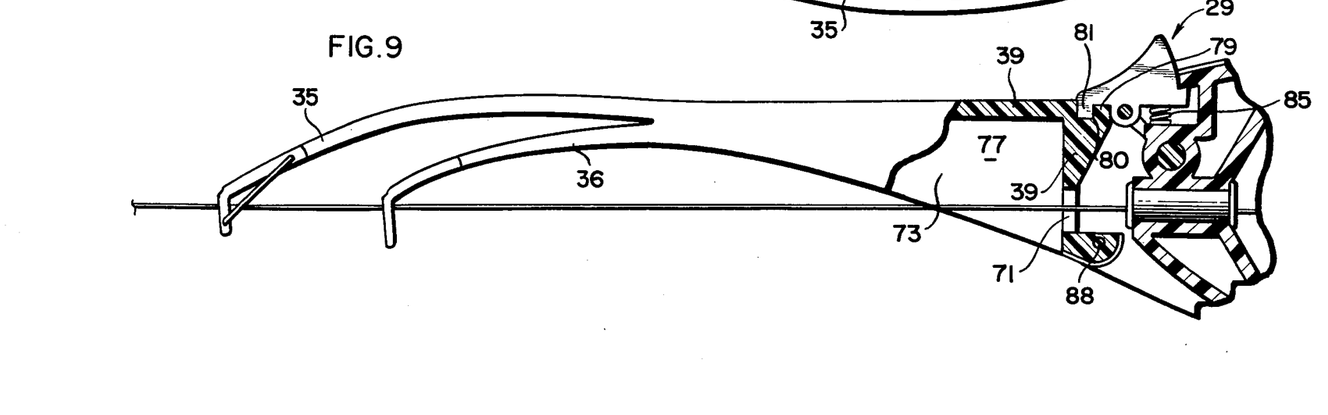
FIG. 9 is an enlarged broken section of the fishing rod in its fishing position, broken to illustrate the rod latch mechanism and guide for the fishing line.

The structural elements as well as their combined utility is illustrated in FIGS. 5 and 6 where it is shown how the fishing rig 10 is converted from its travel configuration of FIGS. 1–3, inclusive, to the fishing configuration of FIG. 4. Initially the tackle box cover 25 is opened and pivots about the cover pin 28 thereby exposing the tackle box 26. At this point the fisherman reaches into the tackle box 26 and removes the bobber 18, its associated fishhook 19, the hook lead 22, swivel snap 24 and the adjacent sinker 21, and the stop bead 23. The line 20 is then loosely connected to the end of the retracted rod 30. Thereafter the fisherman closes the tackle box cover 25, removes the handle nut 52 and then the reel handle 51 is reversed exposing the finger grip 54 in the configuration ready for use as illustrated in FIG. 6. Further as illustrated in FIG. 6, the rod 30 is grasped and pivoted around the rod pivot pin 88 until the upper portion of the rod base 39 is secured by the rod latch 29. In the ready for fishing configuration as shown in FIG. 6, it will be seen that the rod 30 has a lead ferrule 31 at the end of the sensing tip 35, and an intermediate larger guide ferrule 32 at the end of the support leaf 36. The fishing rig 10 is thus ready for fishing, as shown in FIG. 9.

Figures 10, 11, 12:
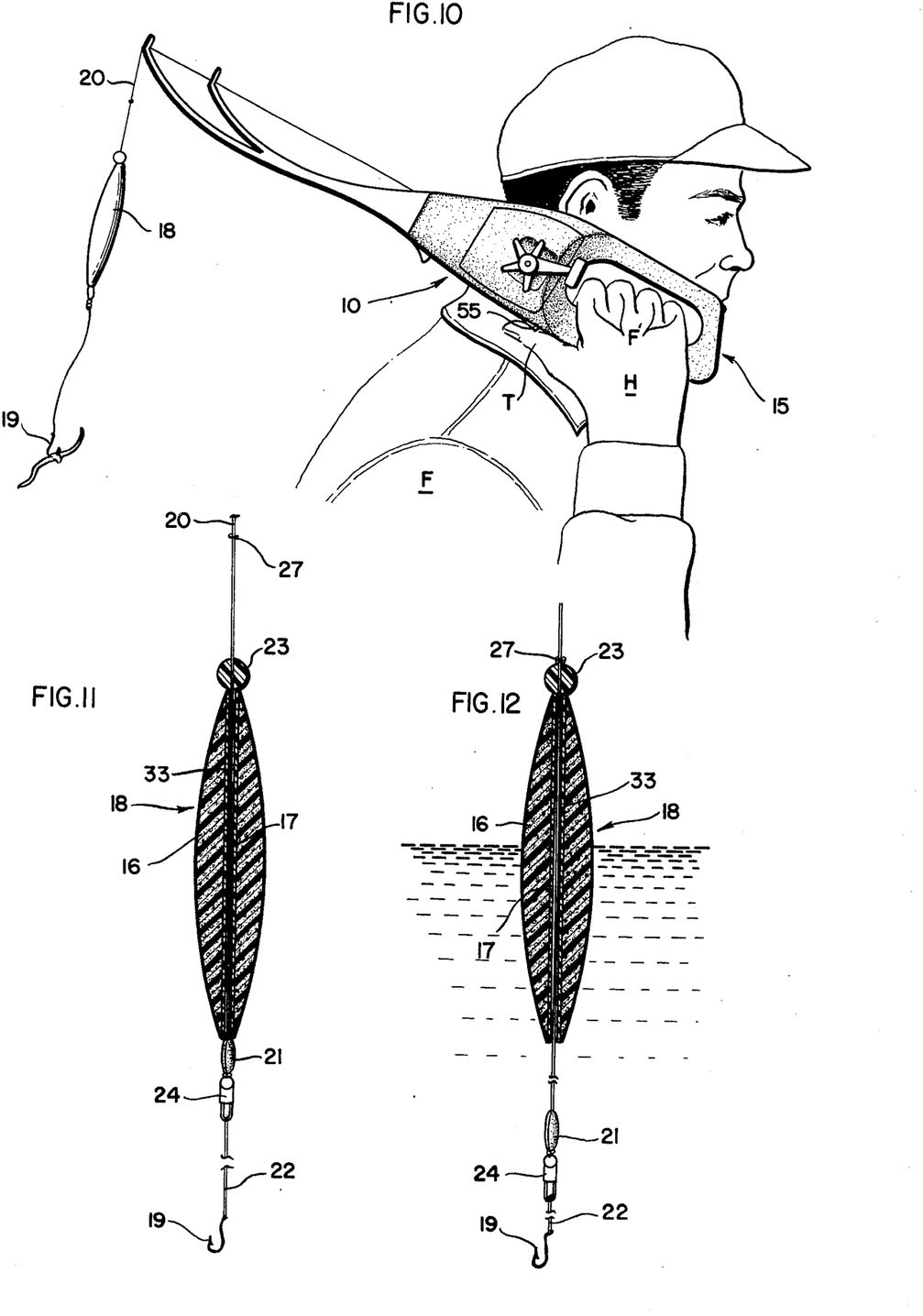
FIG. 10 illustrates a fisherman preparing to cast a bobber and hook with the fishing rig.
FIG. 11 is a longitudinal sectional view illustrating the bobber, and its associated fishing tackle elements in the position ready for casting.
FIG. 12 is a sequential view of the bobber as illustrated in FIG. 11, showing how the depth of the fish hook is regulated by a present combination of the tackle elements.

In actual use, further as illustrated in FIG. 10, the fisherman F grasps the handle 15 and with his thumb T, depresses the reel clutch 55 thereby snubbing the line 20 against dislodgment from the reel. The rest of the fingers F' are curled around the upper portion of the handle 15 and engage the finger grip 99 beneath the tackle box portion 26 of the handle 15. In timed relation to rotating the wrist and arm to cast the bobber 18 forwardly, the fisherman F releases his thumb T from the reel clutch 55, and then the line 20 and bobber 18 cast freely through the air until they either lose inertia, or are stopped short by the fisherman F. Here it will be particularly appreciated that the hand H of the fisherman F is in golf grip relationship with the handle 15 and the finger grip 99, the same being secured against dislodgment not only by the tightness of the grip of the fingers F' which can be maintained, but the closed nature of the C-shaped handle 15. Furthermore, the thumb T is in its natural position to depress the reel clutch control 55 which not only facilitates a stronger grip, but presents a more natural means of holding and releasing the lure thereby making it much easier for the novice to master good casting technique with the unit, and to even very effectively use the same with an underhanded cast.

For an understanding further of the arrangement of the tackle, it will be seen in FIG. 11 that the fishing line 20 is provided with a depth knot 27, and a stop bead 23 which slides up and down the line 20, but is stopped at the upper portion by the depth knot 27. The bobber 18 is ideally formed by fitting together a floating bobber outer portion 16 and a bobber tube portion 17, the two together defining a bobber line guide 33 through the length of the bobber 18. In the configuration shown in FIG. 11, which is the same as shown in FIG. 10 as ready for casting, the bobber 18 slides down line 20 along the bobber line guide 33 until stopped at the sinker 21 is secured immediately above the swivel snap 24, the latter being secured to the hook lead 22. The hook 19, of course, is baited when ready for fishing, as shown in FIG. 10. After the bobber 18 hits the water, as shown in FIG. 12, the bobber 18 floats on the surface of the water, and the sinker 21 lowers the line 20 until the depth knot 27 engages the stop bead 23. The depth knot 27 is located at such a position on the line 20 to regulate the depth beneath the surface to which the hook 19 and its associated sinker 21 will descend. This depth will vary widely depending upon the depth of the water, the type of fish being sought, the lure being used, the time of year, and all of the other variables which constitute the lore of fishing.

The elements of fishing rig 10 are tied together by the basic construction of the reel housing 40, and a means whereby the reel 50 may be removed for service, replacement of the line 20 when broken, or when a change is made to utilize a different weight of line, is shown diagrammatically in FIG. 7. There it will be seen that the reel plate 45 is removed by unfastening the two reel plate screws 46 and removing the same from the screw bosses 48 provided in the reel housing 40. Thereafter the reel 50, of the type manufactured and marketed under various trademarks but generically known as a spinning reel, is removed by pulling the same, along with the reel plate 45, outwardly from the reel chamber 44. It will be noted in FIG. 8 that a reel mount 75 is provided in the lower portion of the reel chamber 44 which contains a lower slot 78. A corresponding reel mount 75 and upper slot 76 are provided at the upper portion of the reel chamber 44. The reel 50 itself is provided with a reel ring 95, and it is the ring 95 which slides into the opposed slots 76, 78 of the reel mount 75. The reel is readied for removal by removing the reel plate screws 46. The entire reel 50 and reel plate 45 are removed as shown in FIG. 7. The reel brake or star wheel 56 is adjacent the reel handle nut 52. A reel brake sink 98 of crescent shape is provided in the reel plate 45 to permit extension of the fingers onto the star wheel 56.

Further it will be noted that the reel clutch control 55 has a depending clutch finger 90 which extends into the reel chamber 44, but which also does not interfere with the removal of the reel 50, again as shown in FIG. 7.

Since the spinning reel 50 is modified by removing its cover, the line chamber 73 (see FIG. 8) is provided with a conical brake shoe 82, the same being extended onto the inner surface of the reel plate 45. Thus, when the finger press 92 is actuated and the reel brake chamber 83 extends forwardly, the line 20 is clamped between the two.

Figure 8:
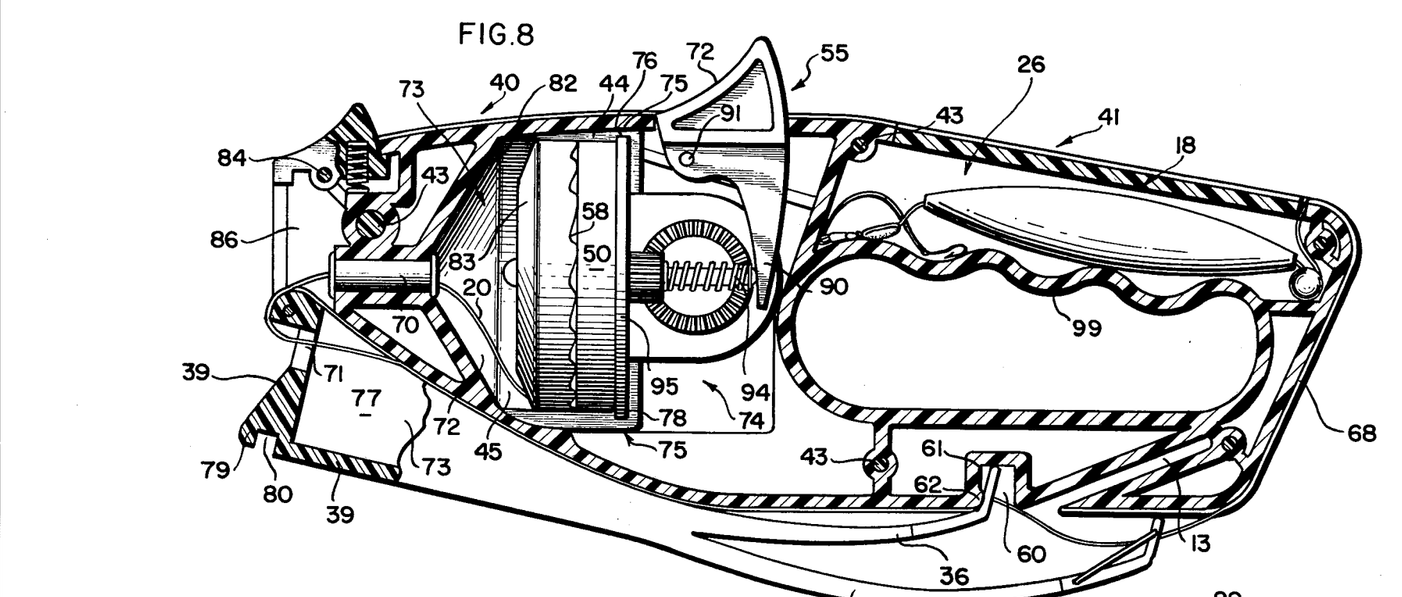
FIG. 8 is a longitudinal sectional view of the fishing rig showing the unit in the stored configuration as illustrated in FIG. 1.

More specific details of the reel housing 40 are shown in the sectional view of FIG. 8. It should firstly be noted that the reel housing 40 (see FIG. 7) is made up of opposed sections, the reel plate side 41, and the reel housing side 42. The two are press-fitted together, and preferably glued, oriented by means of the male-female pin locating members 43. The preferred material for manufacturing the unit is cycalac since the same is highly resistant to corrosion, is relatively inexpensive, and can be easily cemented one part to the other.

The positioning of the reel 50 and its removal as described with regard to FIG. 7, will further be appreciated in detail as to FIG. 8 where it will be seen that the reel mounts 75 are slotted members at the upper portion and lower portion of the reel chamber 44, and have opposed upper slots 76 and lower slots 78 which slidably receive the reel ring 95. The reel plate 45 is provided with corresponding opposed reel mounts 75. The line spool 58 portion of the reel 50 is buried within the reel 50, but the line 20 leads outwardly through the line guide 70 at the forward portion of the reel housing 40, and then into the line opening 71 of the fishing rod portion 30, which is a molded hole at the lower portion of the rod base 39 as shown clearly in both FIGS. 8 and 9. As will be particularly noted in FIG. 9, the alignment of the line guide opening 71 and the ferrules 31, 32 is such that the line 20 passes through a central portion of the rod line opening 71 thereby eliminating the source of friction at that point, the line further passing through the line chamber 73 which is hollowed out at the base of the rod 39. The side walls 77 which flank the line chamber 73 provide sufficient strength at the base 39 of the rod portion 30 to handle good-sized fish. Furthermore, the support leaf 36 is desirably of an elliptical configuration with the major axis of the elipse in the vertical plane to thereby strengthen its construction, whereas the sensing tip 35 is relatively flat and generally rectangular in cross section, the long axis of the rectangular cross section being horizontal. The cooperative effect is for the sensing tip 35 to transmit slight tugs when the fish hits the bait, and thereafter to bend over and engage the support leaf 36 when the larger fish are being landed.

To be further noted in FIG. 8 is the rod ferrule catch 60 provided in the lower portion of the handle 15. The guide ferrule 32 snap-fittingly engages the ferrule boss 62 on the catch end 61. This action assists in holding the two ferrules and the rod 30 against the underneath portion of the reel housing 40 and handle 15 in the travel configuration.

It will be further noted that the reel 50 illustrated typically has a clutch rod 94 at the rear portion which extends into the control section 74 of the reel chamber 44. The clutch rod 94 is engaged by the clutch finger 90 at the lower portion of the reel clutch control 55. The reel clutch control 55 is pivoted about the pivot pin 91, and by depressing the thumb on the finger press portion 92 of the reel clutch control 55, the clutch finger 90 engages the clutch rod 94 and actuates the same.

The rod latch 29 will be better understood as to its details of construction by reference to FIG. 9, showing the same engaging the rod 30 in the fishing configuration. In order to achieve this configuration, the fisherman grasps either one or both of the sensing tip 35 and support leaf 36 of the rod 30, and pulls the same out of the engaged relationship within the rod ferrule catch 60. The rod is then pivoted about the rod pivot pin 88 from the configuration shown in FIG. 8 until the configuration shown in FIG. 9, whereupon the rod latch 29 is depressed to raise the latch pawl 81 so that it can drop into position in the latch notch 80 provided in the rod base 39, and lockingly secured the same against the latch stub 79 at the rear upper portion of the rod base 39. The rod latch 29 is held in position by means of the latch spring 85, pivotally urging the latch 29 to seat the latch pawl 81 within the latch notch 80 about the pivotal axis defined by the latch pin 84. The rear portion of the rod base 39 sets within a receiving recess 86 at the forward portion of the line section 72 of the reel chamber 44. The line 20 then passes freely through the line guide 70, and the rod line opening 71 and through the guide ferrule 32 and then the lead ferrule 31 ready for fishing. It will be further noted in FIG. 8 that the bobber 18 along with its associated fishing gear fits neatly within the tackle box 26, and that the line 20 nests within a line slot 68 which is provided about the rear portion of the handle 15, so that when the reel is tightened after positioned into the carrying configuration as shown in FIG. 7, the line 20 is tightened within the line slot 68 and free of the risk of snagging.

The length of the rod effectively is approximately 7½ inches. By providing a bifurcated end construction comprising the sensing tip 35, and the support leaf 36, the rod 30 even though quite short has the sensitivity of a much longer rod. On the other hand, if a larger fish is caught, as the sensing tip bends due to the pressure on the lead ferrule 31, the same will mate up against the upper face of the support leaf 36, and in effect harden up and become a much more sturdy composite rod for fighting and landing the fish.

Avoiding friction will significantly increase the distance of the average cast. To this end it has been found that the lead ferrule 31 and the guide ferrule 32 are preferably made out of stainless steel or chrome plated material, but in all events a very hard metal surface. The guide ferrule 32 has a larger diameter opening than the lead ferrule 31 to further reduce friction by concentrating the same on the lead ferrule 31. In certain instances it will be desirable to employ only the lead ferrule 31, omitting the guide ferrule 32. In this instance the rod 30 is not bifurcated at its end, but tapers to a single lead ferrule 31. Similarly, the line guide 70 which receives the line from the reel and leads the same through the rod line opening 71 is desirably made of stainless steel or chrome plated steel, and preferably has a 5/16 inch inside diameter to thereby induce as little friction as possible as the line passes therethrough to the ferrules on the rod.

Alternative and equivalent constructions are naturally contemplated as falling within the scope of the invention. For example, spinning reels with a modified rear end support will similarly slip in and out of the reel mount 75, and be accommodated by the upper slot 76 and lower slot 78. A split construction of the reel housing 40 by means of the control side 41 and reel side 42 may, with quick removing screws rather than the male-female side locking members 43 as shown, eliminate the necessity for the reel plate 45 and reel plate screws 46.

It will be further appreciated that although the retractable rod 30 is believed the most advantageous feature, for those who do wish to use a longer rod, a telescoping rod removably secured to the forward portion of the reel housing by means of an alternative type latch construction may be employed, still utilizing the balance of the advantages of the reel housing and handle construction. Additionally, while the tackle box cover 25 has been shown as secured by means of a pivot pin 28, snap fastening means may also be employed to reduce the cost of assembly, and replacement when the part becomes broken.

Although particular embodiments of the invention have been shown and described in full here, there is no intention to thereby limit the invention to the details of such embodiments. On the contrary, the invention is to cover all modifications, alternatives, embodiments, usages and equivalents of a fishing rig as fall within the spirit and scope of the invention, specification and the appended claims.

What is claimed is:
1. A fishing rig comprising, in combination,
a reel housing portion,
a fishing reel and line encased in said housing portion,
guide means for said line in the housing portion,
a handle portion at one end of said reel housing portion positioned to one side of a horizontal plane passing through said line guide means,
a rod pivotally secured by pivotal support means to one end of said reel housing portion opposite said handle portion,
engaging means spaced from said pivotal support means on said end opposite the handle portion for releasably and lockably securing said rod to said reel housing portion in an operative position,
an elongate upwardly opening tackle box within one portion of the handle which receives the fishing lure, hook, and related fish catching elements secured to the remote portion of the line,
pivotal rearwardly opening cover means for said tackle box,
fishing line guide means provided in the handle between the retracted position of the remote end of the rod and the tackle box for storing the fishing apparatus,
said rod and said housing having a substantially complementary silhouette,
whereby the rod, upon release of the engaging means, is foldable against the reel housing portion in a retracted position between its opposed ends with the rod being in close proximity to that portion of the housing and handle on the opposite side of said horizontal plane from the handle and along substantially the length of the rod.

2. In the fishing rig of claim 1 above,
a reel plate on a side portion of the reel housing covering an open housing portion,
means for securing said reel plate to be opened, thereby presenting the open housing portion,
said reel being proportioned and oriented for locking within said housing by positioning a portion thereof through said reel plate, and securing by means of attaching the reel handle for the reel.

3. In the fishing rig of claim 1,
said rod having a bifurcated end portion, one portion thereof being a lower support portion and one portion being an upper sensing portion,
said upper portion terminating at a position more remote to the reel housing than the bottom portion,
each of said portions having a line guide at the end portion thereof,
whereby the line extending from said reel may be passed through both of said guides, and thus providing a double guide for the line.

4. In the fishing rig of claim 3,
said guides extending downwardly from the sensing and support portions, and
said rod having an enlarged base portion with a line opening therein.

5. In the fishing rig of claim 3,
a reel plate on a side portion of the reel housing covering an open housing portion,
means for securing said reel plate to be opened, thereby presenting the open housing portion,
said reel being proportioned and oriented for locking within said housing by positioning a portion thereof through said reel plate, and securing by means of attaching the reel handle for the reel.

6. In the fishing rig of claim 3,
a rod line guide catch in the lower portion of the handle, and
means in a wall of said catch to removably engage said rod and a line guide in the retracted position.

7. In the fishing rig of claim 3,
said lower support portion having an elliptical cross section with the major axis oriented vertically, and
said upper sensing portion having a rectangular cross section with the long axis oriented horizontally,
whereby the sensitivity of the upper sensing portion is increased, and the coacting reinforcement of the support portion is increased with a given cross section of material.

8. In the fishing rig of claim 1,
said handle forming a close C-shape with said reel housing.

9. In the fishing rig of claim 8,
said rod having a bifurcated end portion, one portion thereof being a lower support portion and one portion being an upper sensing portion, said upper portion terminating at a position more remote to the reel housing than the bottom portion, each of said portions having a line guide at the end portion thereof, whereby the line extending from said reel may be passed through both of said guides, and thus providing a double guide for the line.

10. In the fishing rig of claim 9, said guides extending downwardly from the sensing and support portions, and said rod having an enlarged base portion with a line guide therein.

11. In the fishing rig of claim 8, a rod line guide catch in the lower portion of the handle, and means in a wall of said catch to removably engage said rod and a line guide in the retracted position.

12. In the fishing rig of claim 1, means defining a belt engaging notch on the lower portion of said handle.

13. In the fishing rig of claim 1, said rod having a base portion extending across the forward end of said housing portion and pivotally secured to said housing portion along a lower edge portion thereof, and means adjacent the upper edge portion of said base portion which coact with engaging means on said end of said housing portion for releasably locking said rod in operative position on said housing portion.

14. A fishing rig as in claim 1, wherein said fishing rod has a base portion which extends across the forward end of the said housing portion, said base portion having a passage therethrough which is coaxial with the longitudinal axis of said reel allowing passage of said line from said housing portion outwardly to said rod section, and said rod section having outer line guide means mounted on the said rod section in axial alignment with the longitudinal axis of said passage for receiving said line.

15. A fishing rig comprising, in combination, a reel housing portion, a spin casting reel and line encased in said reel housing portion, a handle extending from one end of said reel housing portion, a portion of which is above the center axis of the reel, a rod portion engageable with that portion of the reel housing opposed to the handle, means for pivotally and releasably locking the rod to the reel housing to permit the rod to pivot against the lower portion of the housing and beneath the handle for storage, means for leading the line contained on said reel to guide means provided on said rod portion, an elongate upwardly open tackle box within the handle proportioned to receive a bobber, hook, and related fish catching elements secured to the remote portion of the line, said reel serving to tension the line when the rod is pivoted into the storage configuration and when the fish catching elements are in the tackle box and the line tensioning serves to secure the line against fouling, and upwardly opening cover means for said tackle box, whereby, when the fish catching elements are stored therein, the same may be stored with the hook portion secured against snagging exterior elements.

16. In the fishing rig of claim 15 above, fishing line guide means provided in the reel housing and handle between the remote end of the rod and the tackle box for storing the fishing apparatus.

17. In the fishing rig of claim 16, in which, said fishing line guide means takes the form of a recessed groove.

18. In the fishing rig of claim 15 above, said handle forming a closed C-shape with said reel housing.

19. In the fishing rig of claim 15, means defining a belt engaging notch in said handle portion.

20. A fishing rig comprising, in combination, a reel housing portion, a reel encased in said reel housing portion, a handle extending from one end of said reel housing portion to the rear thereof, a rod portion engageable with that portion of the reel housing opposed to the handle, means for mounting said rod to be retractable to a position beneath the reel housing and handle, said handle having a handgrip portion with a longitudinal axis approximately parallel with that of the rod, a closed end on said handle depending from the rear of said handgrip portion and a lower portion of the handle extending forwardly to the reel housing substantially parallel to said handle, a clutch control mechanism for said reel extending upwardly from the reel housing at approximately the juncture between the handgrip portion of the handle and the reel housing, whereby the user of said fishing rig grasps the handgrip in golf grip relationship to the clutch control, and whereby the closed end and lower portions of the handle inhibit the same from slipping away from the hand of the user while using to the end that a natural grip relationship is obtained between the user's casting hand and the fishing rig during the manipulation of casting.

21. In the fishing rig of claim 20 above, an elongate tackle box within the handgrip portion of the handle which receives the fishing lure, hook, and related fish catching elements secured to the remote portion of the line, and cover means for said tackle box, whereby when the fish catching elements are stored therein the same may be stored with the hook portion secured against snagging exterior elements.

22. In the fishing rig of claim 21 above, fishing line guide means provided in the reel housing and handle between the remote end of the rod and the tackle box for storing the fishing apparatus.

23. In the fishing rig of claim 20 above, a rod line guide well provided in the lower portion of said handle, line guide means on said rod, line guide engaging means in said line guide well for removably engaging said rod in the underneath retracted configuration.

24. In the fishing rig of claim 20, means defining a belt engaging notch in said handle portion.

25. A fishing rig comprising, in combination, a reel housing portion, a fishing reel encased in said housing portion,
a handle portion at one end of said reel housing portion,
a rod pivotally lockably secured to one end of said reel housing portion opposite said handle portion,
said rod having an enlarged base portion tapering and narrowing towards its outer end,
means for pivotally securing the rod at its base portion to the reel housing portion for movement between extended and rearwardly retracted positions,
said rod base having a line chamber therein defined by the base side walls,
an end of said rod base having an opening,
a tubular line guide in the forward portion of the reel housing in alignment with said rod base opening,
and a line guide on the rod,
the reel housing tubular guide, the rod base opening, and the rod line guide all being aligned when the rod is extended,
whereby line friction when casting is subjected to a minimized frictional action because of the guide alignment.

26. In the fishing rig of claim 25,
said rod having an outer line guide means for maintaining said line operatively associated with said rod at a point spaced from said base portion and said outer line guide means when said rod is in said retracted position being disposed at about the rear end of said housing portion, a compartment formed in the handle adapted to retain the outer end of the line in said handle portion,
whereby said rod can be held in said retracted rearwardly extending position with minimal exposure of said line by securing the outer end of said line within said compartment and applying tension on said line by means of said reel.

27. A fishing reel housing and handle construction for a compact fishing rig comprising, in combination,
a housing portion having a reel chamber adjacent the forward end of the housing portion,
a fishing reel and line assembly operatively mounted in said reel chamber with the axis of said reel and line assembly aligned substantially with the longitudinal axis of said housing portion,
a C-type handle portion intergral with said housing portion extending rearwardly of said reel chamber,
a handgrip portion of said handle forming an extension surface of said housing portion with the longitudinal axis of said handgrip portion being substantially parallel with and disposed above the longitudinal axis of said housing portion,
said housing portion having an inner line guide means axially aligned with the axis of said reel adjacent the forward end thereof extending forwardly through a forward wall of said reel chamber,
a compact fishing rod section,
said housing portion having support means at the forward end thereof adjacent said reel chamber for releasably securing said compact fishing rod section on said housing portion,
wherein a said fishing rod section having a base portion which extends across the forward end of the said housing portion is movably secured in an operative position at the forward end of said housing portion,
said base portion having a passage therethrough which is coaxial with the longitudinal axis of said inner line guide means of said housing portion and which is adapted to guide said line from said housing portion outwardly to said rod section,
and said rod section having outer line guide means mounted on the said rod section in axial alignment with the longitudinal axis of said passage in said base portion and said inner line guide means.

28. A fishing reel and handle construction as in claim 27 wherein said base portion is pivotally secured to the forward end of said housing along a lower edge portion thereof for coacting with engaging means on said housing portion for releasably locking said rod section in operative position on said housing portion, and said rod section being pivotally movable from said operative position into a retracted rearwardly extending position with said rod section being disposed in close proximity with the lower surface of said housing portion between the ends thereof along substantially the length of said rod section.

29. A fishing reel housing and handle construction as in claim 28, wherein the said rod section at a point spaced from said base portion is provided with an outer line guide means for maintaining said line operatively associated with an outer end portion of said rod section, and said outer line guide means when said rod section is in said retracted position being disposed adjacent the rear end of said housing portion, a compartment formed in said handle adapted to retain therein the outer end of said line in said handle portion, whereby said rod section can be held in said retracted rearwardly extending position with minimal exposure of said line by securing the outer end of said line within said compartment and applying tension on said line by means of said reel.

30. A fishing rig comprising, in combination,
a reel housing portion,
a fishing reel encased in said housing portion,
a narrow handle portion at one end of said reel housing portion,
a rod extending from one end of said reel housing opposite to said handle portion,
said handle being a closed C-shaped member extending from said reel housing and less than one-half the width of said reel housing, the upper portion of the handle being the handgrip and the lower portion being substantially parallel to the upper portion with an end joining the two portions to close the C-shape,
said handle at the remote end of the lower portion thereof having a belt engaging notch,
whereby the fishing rig may be positioned in the pocket of a fisherman by inserting the handle portion therein, or alternatively hung on the belt of the fisherman with the rod extended by means of the belt engaging member thus insuring the portability and ease and use in fishing with, carrying, storing, and transporting the same.

31. In the fishing rig of claim 30,
pivotal means securing said rod to the housing and retractable against the housing,
thereby further reducing the bulk of the rig for storage and portability.

32. A fishing reel housing and handle construction for a compact fishing rig comprising, in combination,
a housing portion having a reel chamber adjacent the forward end of the housing portion,
a fishing reel and line assembly operatively mounted in said reel chamber with the axis of said reel and line assembly aligned substantially with the longitudinal axis of said housing portion, a C-type handle portion intergral with said housing portion extending rearwardly of said reel chamber, a handgrip portion of said handle forming an extension surface of said housing portion with the longitudinal axis of said handgrip portion being substantially parallel with and disposed above the longitudinal axis of said housing portion, said housing portion having an inner line guide means axially aligned with the axis of said reel adjacent the forward end thereof and extending forwardly through a forward wall of said reel chamber, a compact fishing rod section, said housing portion having support means at the forward end thereof adjacent said reel chamber for releasably securing said compact fishing rod section on said housing portion, wherein said housing portion has mounted on the forward end thereof a said fishing rod section having a base portion which extends across the forward end of said housing portion with said base portion being pivotally secured thereto along a lower edge portion thereof and having means adjacent the upper edge portion thereof for coacting with engaging means on said housing portion for releasably locking said rod section in operative position on said housing portion, and said rod section being pivotally movable from said operative position into a retracted rearwardly extending position with said rod section being disposed in close proximity with a lower surface of said housing portion between the ends thereof along substantially the length of said rod section.

33. A fishing reel housing and handle construction as in claim 32, wherein the said rod section at a point spaced from said base portion is provided with an outer line guide means for maintaining said line operatively associated with an outer end portion of said rod section, and said outer line guide means when said rod section is in said retracted position being disposed adjacent the rear end of said housing portion, a compartment formed in said handle adapted to retain therein the outer end of said line in said handle portion, whereby said rod section can be held in said retracted rearwardly extending position with minimal exposure of said line by securing the outer end of said line within said compartment and applying tension on said line by means of said reel.

* * * * *